(12) United States Patent
Furuzawa

(10) Patent No.: US 12,247,698 B2
(45) Date of Patent: Mar. 11, 2025

(54) HIGH-PRESSURE TANK AND METHOD FOR PRODUCING THE SAME

(71) Applicant: TOYOTA JIDOSHA KABUSHIKI KAISHA, Toyota (JP)

(72) Inventor: Akiyoshi Furuzawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 573 days.

(21) Appl. No.: 17/644,825

(22) Filed: Dec. 17, 2021

(65) Prior Publication Data
US 2022/0196206 A1    Jun. 23, 2022

(30) Foreign Application Priority Data
Dec. 17, 2020    (JP) .................................. 2020-208984

(51) Int. Cl.
*F17C 1/06*    (2006.01)

(52) U.S. Cl.
CPC ........ *F17C 1/06* (2013.01); *F17C 2201/0109* (2013.01); *F17C 2203/0604* (2013.01); *F17C 2203/0609* (2013.01); *F17C 2203/0665* (2013.01); *F17C 2203/067* (2013.01); *F17C 2205/0305* (2013.01)

(58) Field of Classification Search
CPC ...... F17C 2201/0109; F17C 2203/0609; F17C 2203/0665; F17C 2203/067
See application file for complete search history.

(56) References Cited

U.S. PATENT DOCUMENTS

| | | | |
|---|---|---|---|
| 11,193,630 B2 * | 12/2021 | Ueda | F17C 1/06 |
| 2012/0024746 A1 * | 2/2012 | Otsubo | B29C 63/10 |
| | | | 156/187 |
| 2017/0219165 A1 * | 8/2017 | Takemoto | B29C 70/86 |
| 2019/0077109 A1 * | 3/2019 | Takemoto | B32B 5/02 |
| 2020/0072414 A1 * | 3/2020 | Iida | F17C 1/16 |
| 2022/0112983 A1 * | 4/2022 | Otsubo | F17C 1/06 |
| 2022/0412508 A1 * | 12/2022 | Satoya | F17C 1/06 |

FOREIGN PATENT DOCUMENTS

| | | |
|---|---|---|
| JP | 2010249146 A | 11/2010 |
| JP | 2020034121 A | 3/2020 |
| WO | 2016020972 A1 | 2/2016 |
| WO | 2018066293 A1 | 4/2018 |

* cited by examiner

*Primary Examiner* — Don M Anderson
(74) *Attorney, Agent, or Firm* — Hunton Andrews Kurth LLP

(57) ABSTRACT

A high-pressure tank that enables end portions of a first reinforcing layer wound around a body of a liner to sufficiently contribute to the strength of dome portions of the tank. In the high-pressure tank, a reinforcing layer includes the first reinforcing layer that covers the body and a second reinforcing layer that covers the first reinforcing layer and side end portions of the liner. The first reinforcing layer includes a hoop reinforcing layer formed through hoop winding of a resin-containing fiber bundle in a midsection of the body, and a helical reinforcing layer arranged in parallel with the hoop reinforcing layer along the axis direction of the high-pressure tank and formed through helical winding of the fiber bundle in a section on at least one end side of the midsection, the helical reinforcing layer forming a part of the dome portions.

5 Claims, 7 Drawing Sheets

HIGH-PRESSURE TANK AND METHOD FOR PRODUCING THE SAME

CROSS REFERENCE TO RELATED APPLICATIONS

The present application claims priority from Japanese patent application JP 2020-208984 filed on Dec. 17, 2020, the entire content of which is hereby incorporated by reference into this application.

BACKGROUND

Technical Field

The present disclosure relates to a high-pressure tank and a method for producing the same.

Background Art

A tank for storing a high-pressure fluid including a liner and a reinforcing layer has been known. The liner has a cylindrical body and dome-like side end portions provided on the opposite sides of the body. The reinforcing layer covers the liner and is formed of fiber reinforced plastics (FRP) containing resin and reinforcing fibers. The reinforcing layer is a structure for securing the strength of the tank against the internal pressure. As a method for producing such a tank (a method for forming a reinforcing layer), a filament winding (FW) technique has been known. The FW technique forms a reinforcing layer by winding the resin-impregnated fiber bundle around the outer periphery of the liner with the tensile force applied to the fiber bundle while rotating the liner.

For example, JP 2020-34121 A discloses a tank with reinforcing layers formed in the following manner and the method for producing the tank using the FW technique. Specifically, this producing method includes forming a first reinforcing layer on the inner side by winding, through hoop winding, the resin-impregnated fiber bundle around the outer periphery of the body of the liner, and forming a second reinforcing layer on the outer side by further winding, through helical winding, the resin-impregnated fiber bundle to cover the side end portions of the liner and the first reinforcing layer.

SUMMARY

The producing method shown in JP 2020-34121 A forms the first reinforcing layer through hoop winding, the first reinforcing layer having its end portions positioned near the dome portions of the high-pressure tank. However, when the internal pressure is exerted on the high-pressure tank, the end portions of the first reinforcing layer receive the hoop stress as does the cylindrical portion of the high-pressure tank, as well as the stress in the direction along the axis of the high-pressure tank. As a result, the end portions of the first reinforcing layer receive the bending stress in some cases. Therefore, when the internal pressure is exerted, the orientation of the fibers in the end portions of the first reinforcing layer is low in the direction in which the bending stress is exerted. Accordingly, the fiber bundle wound in the end portions of the first reinforcing layer may occasionally fail to sufficiently contribute to the strength of the high-pressure tank.

The present disclosure has been made in view of the foregoing, and provides a high-pressure tank that enables the end portions of the first reinforcing layer wound around the body of the liner to sufficiently contribute to the strength of the dome portions of the high-pressure tank, and a method for producing such a high-pressure tank.

The present disclosure provides a high-pressure tank having dome portions formed at opposite ends of a cylindrical portion, which includes a liner having a cylindrical body and dome-like side end portions provided at opposite ends of the body, and a reinforcing layer that covers the liner and is formed of a fiber-reinforced resin, in which the reinforcing layer includes a first reinforcing layer that covers the body and a second reinforcing layer that covers the first reinforcing layer and the side end portions, the first reinforcing layer having a hoop reinforcing layer formed through hoop winding of a resin-containing fiber bundle in a midsection of the body, and a helical reinforcing layer arranged in parallel with the hoop reinforcing layer along an axis direction of the high-pressure tank and formed through helical winding of the fiber bundle in a section on at least one end side of the midsection, the helical reinforcing layer forming a part of the dome portions.

According to the present disclosure, the hoop reinforcing layer of the first reinforcing layer provided in the midsection of the body can enhance the strength (hoop strength) against the hoop stress exerted on the cylindrical portion of the high-pressure tank. In addition, the helical reinforcing layer is provided on one end side of the hoop reinforcing layer in a section on at least one end side of the midsection of the body, so that the bending strength of the dome portion can be enhanced as compared to the first reinforcing layer formed only through hoop winding. This also allows the second reinforcing layer that forms the dome portions to be thinner.

In some embodiments, the helical reinforcing layer may have an inclined surface relative to the outer peripheral surface of the body in the cross section along the axis direction of the high-pressure tank from the boundary between each of the side end portions and the body toward a side of the hoop reinforcing layer.

According to such an embodiment, the inclined surface provided in the helical reinforcing layer reduces the step between the outer peripheral surface of the side end portion and the surface of the helical reinforcing layer, thereby enabling to suppress the stress concentration caused by the step. In addition, the stress on the inclined surface exerted from the second reinforcing layer is in the direction crossing the axis of the high-pressure tank. Therefore, since the fiber bundle of the helical reinforcing layer having the inclined surface is wound to be inclined relative to the axis, the strength of the dome portions can be enhanced as compared to the first reinforcing layer formed only through hoop winding.

In some embodiments, the second reinforcing layer may be formed through helical winding of the fiber bundle so as to extend between the side end portions, and the winding angle of the fiber bundle to form the helical reinforcing layer may be greater than the winding angle of the fiber bundle to form the second reinforcing layer and smaller than the winding angle of the fiber bundle to form the hoop reinforcing layer.

In such an embodiment, since the bending strength of the dome portions can be enhanced as compared to forming the first reinforcing layer only through hoop winding, the number of layers (number of times of winding) of the fiber bundle to form the second reinforcing layer can be reduced. In addition, with the winding angle of the fiber bundle to form the helical reinforcing layer set within the range stated above, the orientation of the fiber bundle of the helical reinforcing layer can be made closer to that of the second reinforcing layer. As a result, the differences in thermal expansion and in thermal shrinkage between the helical reinforcing layer and the second reinforcing layer are reduced, so that the strength at the interface between the helical reinforcing layer and the second reinforcing layer can be secured.

In some embodiments, the helical reinforcing layer may have a first end portion on the side of the hoop reinforcing layer and a second end portion on the side of the side end portion along the axis direction of the high-pressure tank, and the winding angle of the fiber bundle to form the first end portion may be greater than the winding angle of the fiber bundle to form the second end portion.

In such an embodiment, the winding angle of the fiber bundle to form the helical reinforcing layer is close to that of the fiber bundle of the hoop reinforcing layer on the side of the hoop reinforcing layer, and is close to that of the fiber bundle of the second reinforcing layer on the side of the side end portion. Thus, since the helical reinforcing layer offsets the difference in strength between the hoop reinforcing layer and the second reinforcing layer, the stress concentration due to the difference in strength can be reduced.

In some embodiments, the winding angle of the fiber bundle to form the helical reinforcing layer may be within a range between 80° and less than 89°.

In such an embodiment, with the winding angle of the fiber bundle to form the helical reinforcing layer set within the range between 800 and less than 89°, the helical reinforcing layer stably wound can be formed in a narrow section of the body.

In some embodiments, a length L of the helical reinforcing layer along the axis direction may be 0.3 times or greater than 0.3 times the outer diameter of the high-pressure tank.

In such an embodiment, with the length L of the helical reinforcing layer along the axis direction set to 0.3 times or greater than 0.3 times the outer diameter of the high-pressure tank, the bending strength of the helical reinforcing layer can be surely improved. When the length of the helical reinforcing layer along the axis direction is less than 0.3 times the outer diameter of the high-pressure tank, the aforementioned effect could not sufficiently be exerted. It should be noted that as the length of the helical reinforcing layer along the axis direction increases, the midsection where the hoop reinforcing layer is formed is narrowed, which decreases the strength of the cylindrical portion of the high-pressure tank against the hoop stress. Therefore, at least part of the first reinforcing layer may include the hoop reinforcing layer in some embodiments. Further, the length L may be close to 0.3 times the outer diameter in some embodiments.

The present disclosure provides a method for producing a high-pressure tank having dome portions formed at opposite ends of a cylindrical portion, which includes preparing a liner having a cylindrical body and dome-like side end portions provided at opposite ends of the body, forming a first reinforcing layer through winding of a resin-containing fiber bundle so as to cover the body, and forming a second reinforcing layer formed of a fiber-reinforced resin so as to cover the first reinforcing layer and the side end portions, in which the forming the first reinforcing layer includes forming a hoop reinforcing layer through hoop winding of the fiber bundle in a midsection of the body and forming a helical reinforcing layer through helical winding of the fiber bundle in a section on at least one end side of the midsection, the helical reinforcing layer arranged in parallel with the hoop reinforcing layer along the axis direction of the high-pressure tank.

According to the present disclosure, the hoop reinforcing layer provided in the midsection of the body can enhance the strength (hoop strength) against the hoop stress exerted on the cylindrical portion of the high-pressure tank. In addition, the helical reinforcing layer arranged in parallel with the hoop reinforcing layer of the first reinforcing layer is positioned near the side end portions. Therefore, in forming the second reinforcing layer, even when the stress in the direction crossing the axis direction of the high-pressure tank is exerted on the liner on which the first reinforcing layer is formed, the helical reinforcing layer can secure the strength.

In some embodiments, in forming the first reinforcing layer, the helical reinforcing layer may be formed so as to have an inclined surface relative to the surface of the body in the cross section along the axis direction of the high-pressure tank from the boundary between each of the side end portions and the body toward a side of the hoop reinforcing layer.

In such an embodiment, with the helical reinforcing layer wound so as to have the inclined surface, the step between the outer peripheral surface of the side end portion and the surface of the helical reinforcing layer is reduced, so that the stress concentration and voids caused by the step can be suppressed. Further, when the portion corresponding to the inclined surface of the helical reinforcing layer is formed through hoop winding as conventionally performed, forming the second reinforcing layer through helical winding of the fiber bundle could cause misalignment of the fiber bundle. The reason is that when an inclined surface is provided, the target surface of winding is inclined relative to the tensile force direction during winding, and thus, the force in the horizontal direction of the inclined surface becomes greater relative to the friction during winding, which causes the fiber bundle to slip off the inclined surface. Forming the inclined surface through helical winding of the fiber bundle reduces the inclination of the target surface of winding relative to the tensile force direction during winding, thereby mitigating the slipping.

In some embodiments, in forming the second reinforcing layer, the second reinforcing layer may be formed through helical winding of the fiber bundle so as to extend between the side end portions, and the winding angle of the fiber bundle to form the helical reinforcing layer may be greater than the winding angle of the fiber bundle to form the second reinforcing layer and smaller than the winding angle of the fiber bundle to form the hoop reinforcing layer.

In such an embodiment, with the winding angle of the fiber bundle to form the helical reinforcing layer set within the range stated above, the orientation of the fiber bundle of the helical reinforcing layer can be made closer to that of the second reinforcing layer. As a result, the differences in thermal expansion and in thermal shrinkage between the helical reinforcing layer and the second reinforcing layer are reduced, so that the strength at the interface between the helical reinforcing layer and the second reinforcing layer can be secured. Further, with the winding angles set within the range of the present configuration, the first layer to form the second reinforcing layer is wound around the helical reinforcing layer which has a winding angle closer to that of the second reinforcing layer as compared to the hoop winding layer, and thus, stable winding can be realized.

In some embodiments, in forming the first reinforcing layer, the helical reinforcing layer is formed so as to have a first end portion on the side of the hoop reinforcing layer and a second end portion on the side of the side end portion along the axis direction of the high-pressure tank, and the fiber bundle is wound so that the winding angle of the fiber bundle to form the first end portion is greater than the winding angle of the fiber bundle to form the second end portion.

In such a configuration, the winding angle of the fiber bundle to form the helical reinforcing layer is close to that of the fiber bundle of the hoop reinforcing layer in the first end portion on the side of the hoop reinforcing layer, and is close to that of the fiber bundle of the second reinforcing layer in the second end portion on the side of the side end portion. Thus, since the helical reinforcing layer offsets the difference in strength between the hoop reinforcing layer and the second reinforcing layer due to the orientation of the fiber bundles, thereby enabling to suppress the decrease in the strength of the tank.

In some embodiments, in forming the first reinforcing layer, the winding angle of the fiber bundle to form the helical reinforcing layer may be within a range between 80° and less than 89°.

In such a configuration, with the winding angle of the fiber bundle to form the helical reinforcing layer set within the range between 80° and less than 89°, the helical reinforcing layer stably wound can be formed also in a narrow section of the body.

In some embodiments, in forming the first reinforcing layer, the length of the helical reinforcing layer along the axis direction may be 0.3 times or greater than 0.3 times the outer diameter of the high-pressure tank.

In such a configuration, with the length of the helical reinforcing layer along the axis direction set to 0.3 times or greater than 0.3 times the outer diameter of the high-pressure tank 1, the bending strength of the helical reinforcing layer can be surely improved. When the length of the helical reinforcing layer along the axis direction is less than 0.3 times the outer diameter of the high-pressure tank, the aforementioned effect could not sufficiently be exerted.

In some embodiments, in forming the first reinforcing layer, the hoop reinforcing layer may be formed such that a plurality of layers formed through hoop winding is layered in the radial direction of the body and the helical reinforcing layer may be formed such that a plurality of layers formed through helical winding is layered in the radial direction of the body, and the hoop reinforcing layer and the helical reinforcing layer may be formed by alternating the layers formed through hoop winding and the layers formed through helical winding.

For example, when the helical reinforcing layer is formed after forming the hoop reinforcing layer, as the difference in shape between the reinforcing layers widens at the boundary between the hoop reinforcing layer and the helical reinforcing layer, voids could be generated. By contrast, since the present embodiment forms single layers through hoop winding and helical winding alternately, the layers are folded and joined together in an overlapping manner at the boundary between the hoop reinforcing layer and the helical reinforcing layer, so that the generation of the voids can be suppressed.

According to the present disclosure, the first reinforcing layer wound around the body of the liner can sufficiently contribute to the strength of the dome portions of the high-pressure tank.

DETAILED DESCRIPTION

The following will describe a high-pressure tank according to an embodiment of the present disclosure and then a method for producing the high-pressure tank with reference to the drawings.

Figure 1:
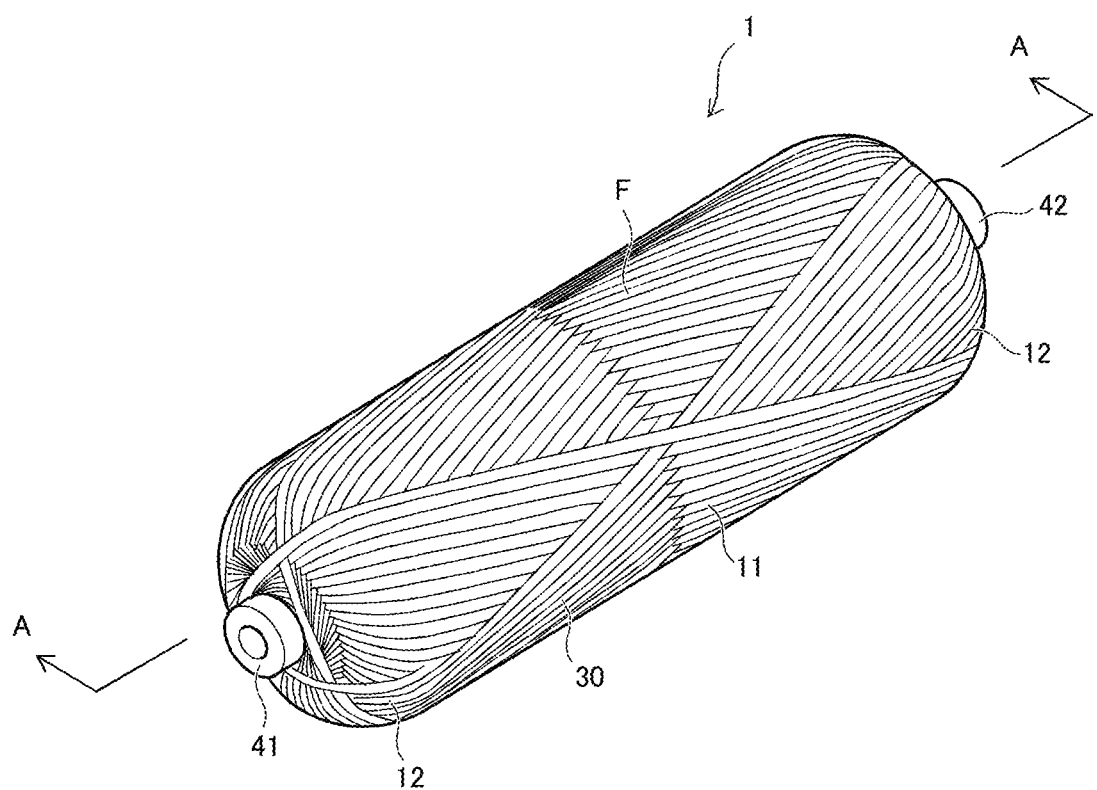
FIG. 1 is an external view of a high-pressure tank according to an embodiment of the present disclosure.

First, the configuration of the high-pressure tank will be described. FIG. 1 is an external view of a high-pressure tank 1 according to the present embodiment. The high-pressure tank 1 includes a cylindrical portion 11 and dome portions 12 formed on the opposite sides of the cylindrical portion 11, and is generally in a substantially ellipsoidal shape. The cylindrical portion 11 and the dome portions 12 are both covered with a reinforcing layer 30 formed of a resin-containing fiber bundle F. Further, metal caps 41 and 42 are formed at the opposite ends of the high-pressure tank 1. One of the caps 41 and 42, for example, the cap 41 is connected to a valve or the like to serve as a path for a fluid when the fluid stored inside the high-pressure tank is supplied to the outside. In that case, the other cap 42 generally serves as a holder of the tank in forming the reinforcing layer around the tank. The other cap 42 is not an essential component for the tank to function.

Examples of the application of such a high-pressure tank 1 include a hydrogen tank for storing a hydrogen gas to be used as a reactant gas for a fuel cell. As the application as the hydrogen tank, various purposes such as a fuel cell vehicle and an emergency power supply using the fuel cell can be conceived. Further, the high-pressure tank can store any fluids such as gases and liquids without limiting to the hydrogen gas.

Next, the structure of the high-pressure tank 1 will be described in detail with reference to FIG. 2.

Figure 2:
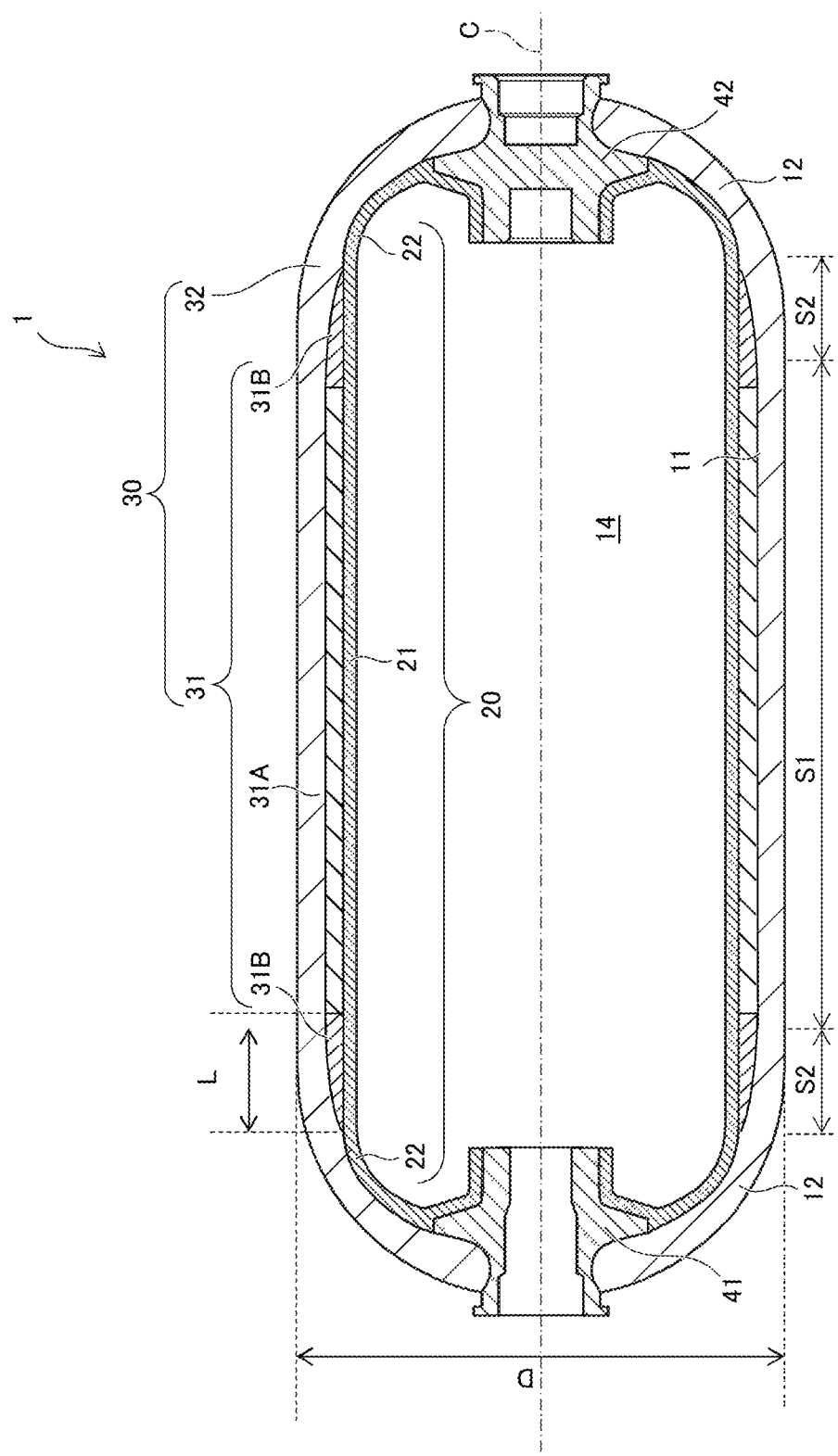
FIG. 2 is a cross-sectional view of the high-pressure tank taken along A-A of FIG. 1.

FIG. 2 is a cross-sectional view of the high-pressure tank 1 taken along A-A of FIG. 1. In the present embodiment, a liner 20 defines a storage space 14 for storing a fluid. The liner 20 includes a cylindrical body 21 and dome-like side end portions 22 at its opposite ends. The liner 20 may include the body 21 and the side end portions 22 integrally formed or formed with members corresponding to the respective portions joined together. The material of the liner 20 may have a property impermeable to the fluid enclosed in the storage space 14 in some embodiments. For example, the material may be resin such as PP (polypropylene) or metal such as aluminum.

The side end portions 22 respectively contact the caps 41 and 42 at the opposite ends of the liner. The caps 41 and 42 are attached to the respective side end portions 22 through, for example, fitting or adhesion. Further, the liner 20 is covered with the reinforcing layer 30 formed of a fiber-reinforced resin. The reinforcing layer 30 includes a first reinforcing layer 31 that covers the body 21 and a second reinforcing layer 32 that covers, on the further outer periphery, the first reinforcing layer 31 and the side end portions 22.

The first reinforcing layer 31 reinforces the liner 20 against the pressure of the fluid stored in the storage space 14. More specifically, the liner 20 is reinforced against the pressure in the radial direction received by the body 21. In some embodiments, the material of the first reinforcing layer 31 may be those suitable for filament winding, that is, may have a strong orientation enhanced by the fibers or the like. For example, the material may be FRP or the like with a resin reinforced by reinforcing fibers such as glass fibers and carbon fibers, in particular, a carbon fiber-reinforced resin (CFRP) in some embodiments.

The second reinforcing layer 32 is formed so as to cover the first reinforcing layer 31 and the side end portions 22 of the liner, and reinforces the liner 20 against the pressure of the fluid inside the storage space 14. The second reinforcing layer 32 is mainly directed to reinforcing the liner 20 against the force exerted on the side end portions 22 along an axis C direction (the direction along an axis C) of the high-pressure tank 1 and also against the pressure exerted in the direction in which the dome-like side end portions 22 expand. The material of the second reinforcing layer 32 may be equivalent to that of the first reinforcing layer 31 in some embodiments, but may be another material.

The first reinforcing layer 31 includes a hoop reinforcing layer 31A and a helical reinforcing layer 31B. The hoop reinforcing layer 31A is a reinforcing layer formed through hoop winding, which will be described later, of the resin-containing fiber bundle F in a midsection S1 of the body 21. Herein, the midsection S1 of the body 21 is a section including the center portion of the body 21 along the axis C direction of the high-pressure tank 1.

The hoop reinforcing layer 31A is a layer formed by winding the fiber bundle F such that the edges of the fiber bundle F along the longitudinal direction overlap with each other without clearance. In the present embodiment, the hoop reinforcing layer 31A is a layer in which a plurality of layers (single layers) formed through hoop winding is layered in the radial direction (the radial direction of the body 21 of the liner 20) of the high-pressure tank 1. It should be noted that the single layer formed through hoop winding is a layer formed by winding the fiber bundle in one direction along the axis C direction of the high-pressure tank 1.

The helical reinforcing layer 31B is arranged in parallel with the hoop reinforcing layer 31A along the axis C direction of the high-pressure tank 1. The helical reinforcing layer 31B is a reinforcing layer formed through helical winding, which will be describe later, of the resin-containing fiber bundle F in a section S2 on at least one end side of the midsection S1. In the present embodiment, the helical reinforcing layers 31B are formed on the opposite end sides of the hoop reinforcing layer 31A, and the hoop reinforcing layer 31A and the helical reinforcing layers 31B are continuously formed.

The helical reinforcing layer 31B is formed such that the bundle F is inclined relative to the axis C direction of the high-pressure tank 1 in the section S2 so that the fiber bundle F is wound while reciprocating in the section S2 a plurality of times with the edges of the fiber bundle F along the longitudinal direction crossing with each other in an overlapping manner. In the present embodiment, the helical reinforcing layer 31B is a layer formed such that a plurality of single layers formed through helical winding is layered in the radial direction (the radial direction of the body 21 of the liner 20) of the high-pressure tank 1. It should be noted that the single layer formed through helical winding is a layer formed by winding the fiber bundle F until the surface of the body 21 or the single layer immediately underneath is covered without clearance.

The helical reinforcing layer 31B forms a part of the dome portions 12 of the high-pressure tank 1 and the hoop reinforcing layer 31A forms a part of the cylindrical portion 11 of the high-pressure tank 1. As shown in FIG. 2, the length of the midsection S1 in the axis C direction may be longer than the length of each section S2 in the axis C direction in some embodiments. This allows the hoop stress exerted on the cylindrical portion 11 of the high-pressure tank 1 to be more efficiently received by the hoop reinforcing layer 31A. Further, the helical reinforcing layer 31B forms a part of the dome portions 12 of the high-pressure tank 1.

Figure 3:
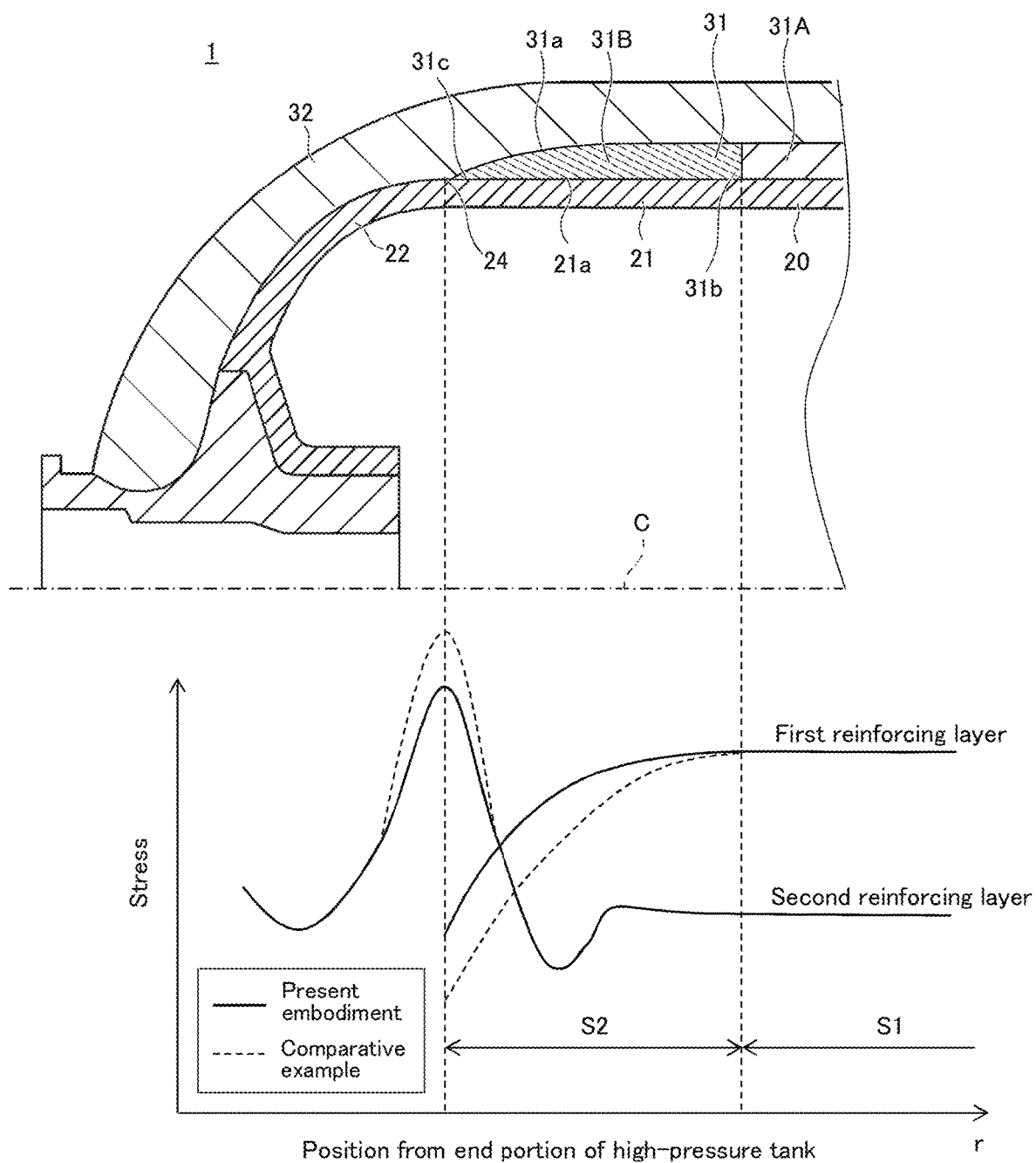
FIG. 3 is a graph showing the stress state of each reinforcing layer when the internal pressure is exerted on the high-pressure tank according to the embodiment of the present disclosure, along with a comparative example.
Figure 4:
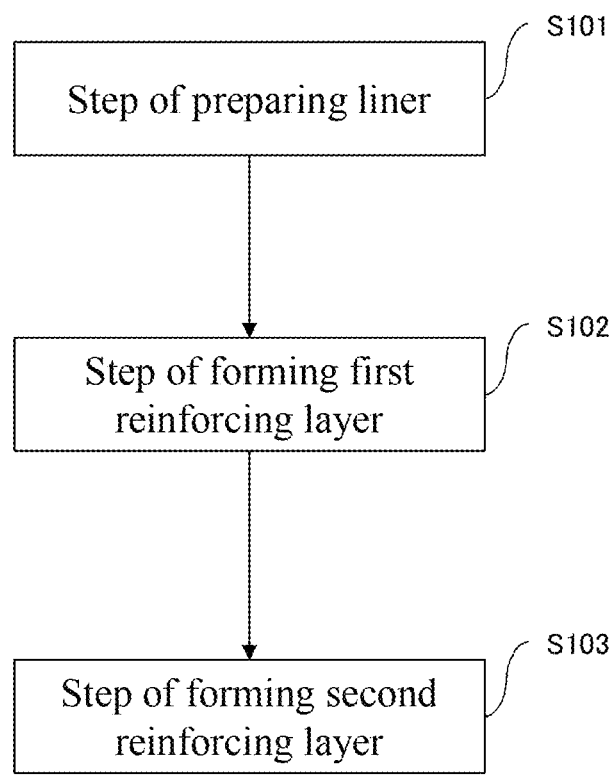
FIG. 4 is a flowchart of a process of a method for producing the high-pressure tank according to the embodiment of the present disclosure.

The view on the upper side of FIG. 3 is an enlarged view of the vicinity of a boundary 24 between the body 21 and the side end portion 22 of the liner 20 in the cross-sectional view of FIG. 2. In the cross section of the high-pressure tank 1 along the axis C direction, the helical reinforcing layer 31B has an inclined surface 31a relative to the outer peripheral surface (surface 21a) of the body 21 from the boundary 24 toward the hoop reinforcing layer 31A side. The inclined surface 31a is formed such that a plurality of layers of the fiber bundle F (single layers formed through helical winding) is layered in the radial direction of the high-pressure tank 1, and the layers of the fiber bundle F (single layers formed through helical winding) are wound so as to deviate to be closer to the center of the axis C direction of the high-pressure tank 1 toward the outer side in the radial direction of the high-pressure tank 1.

In the aforementioned embodiment, the helical reinforcing layer 31B has the inclined surface 31a, but the configuration is not limited thereto. However, this configuration can produce the following advantageous effects.

The inclined surface 31a provided in the helical reinforcing layer 31B can reduce the step between the outer peripheral surface of the side end portion 22 and the surface of the helical reinforcing layer 31B, so that the stress concentration due to the step can be suppressed. In addition, the stress exerted on the inclined surface 31a from the second reinforcing layer 32 is a stress in the direction crossing the axis of the high-pressure tank 1. Thus, the fiber bundle F of the helical reinforcing layer 31B where the inclined surface 31a is formed is wound so as to be inclined relative to the axis. This can enhance the strength of the dome portions 12 as compared to forming the first reinforcing layer 31 only through hoop winding.

The second reinforcing layer 32 is formed through helical winding of the fiber bundle F so as to extend between the side end portions 22 on the opposite sides of the liner. Herein, as will be described later, as long as the helical reinforcing layer 31B can enhance the strength of the high-pressure tank 1, the winding angle of the fiber bundle F to form the reinforcing layer 30 is not limited. In the present embodiment, the winding angle of the fiber bundle F may satisfy the following relations in some embodiments.

Specifically, a winding angle θ2 (see FIG. 5C) of the fiber bundle F to form the helical reinforcing layer 31B is greater than a winding angle θ3 (see FIG. 5D) of the fiber bundle F to form the second reinforcing layer 32. In addition, the winding angle θ2 of the fiber bundle F to form the helical reinforcing layer 31B is smaller than a winding angle θ1 (see FIG. 5B) of the fiber bundle F to form the hoop reinforcing layer 31A.

For example, the winding angle θ2 of the fiber bundle F to form the helical reinforcing layer 31B may be constant. In the present embodiment, the helical reinforcing layer 31B includes a first end portion 31b on the hoop reinforcing layer 31A side and a second end portion 31c on the side end portion 22 side along the axis C direction of the high-pressure tank 1. The winding angle θ2 of the fiber bundle F to form the first end portion 31b may be greater than the winding angle θ2 of the fiber bundle F to form the second end portion 31c in some embodiments. For example, the winding angle θ2 of the fiber bundle F may change in inclination from the first end portion 31b toward the second end portion 31c. Each single layer to form the helical reinforcing layer 31B satisfies such a relation of the winding angle θ2. The winding angle θ2 of the fiber bundle F to form the helical reinforcing layer 31B may be within a range between 80° and less than 89° in some embodiments.

Further, the length L of the helical reinforcing layer 31B along the axis C direction of the high-pressure tank 1 is 0.3 times or greater than 0.3 times the outer diameter D of the high-pressure tank.

With reference to the drawing on the lower side of FIG. 3, the advantageous effects of the present embodiment will be described. The graph on the lower side of FIG. 3 shows the stress exerted on the fiber bundle to be received by the first reinforcing layer 31 and the second reinforcing layer 32 when a constant internal pressure is exerted on the high-pressure tank 1. FIG. 3 also shows the stress in a comparative example in which a portion corresponding to the helical reinforcing layer 31B is formed with the hoop reinforcing layer (that is, the first reinforcing layer 31 is formed only through hoop winding). FIG. 3 indicates the stresses of the present embodiment and the comparative example with a solid line and a dashed line, respectively.

In the present embodiment, the helical reinforcing layer 31B forms a part of the dome portion 12 of the high-pressure tank 1. Therefore, as compared to the end portion of the first reinforcing layer formed only through hoop winding as in the comparative example, the fiber direction of the fiber bundle F of the helical reinforcing layer 31B is closer to the direction along the peripheral surface of the dome portion 12. Herein, since the fiber bundle F has a higher strength in the fiber direction than in the other directions, as the fiber direction is closer to the direction of the force, the strength of the high-pressure tank 1 can be enhanced. Hence, the helical reinforcing layer 31B in a portion of the section S2 of the first reinforcing layer 31 in the present embodiment contributes to improving the strength of the dome portion 12 of the high-pressure tank 1.

In the comparative example, the stress distribution in the second reinforcing layer 32 tends to intensify near the boundary 24, while in the present embodiment, with the helical reinforcing layer 31B formed, the maximum stress to be received by the second reinforcing layer 32 can be reduced. This can lower the reference strength required for the second reinforcing layer 32 to form the dome portions 12, thereby allowing the second reinforcing layer 32 to form the dome portions 12 to be thinner. It should be noted that in the present embodiment, with the helical reinforcing layer 31B provided near the boundary 24, the stress in the fiber direction of the first reinforcing layer 31 is greater than that of the comparative example, but the stress generated in this portion is insignificant as compared to the other portions, and thus, the strength of the high-pressure tank 1 is not reduced.

In the aforementioned embodiment, the second reinforcing layer 32 is formed through helical winding, which will be described later, of the fiber bundle F so as to extend between the side end portions 22 on the opposite sides of the liner, but the configuration is not limited thereto. For example, the second reinforcing layer 32 may be formed through resin molding as used in the RTM technique or the like, in place of the filament winding technique. Further, the winding angle θ2 of the fiber bundle F to form the helical reinforcing layer 31B is greater than the winding angle θ3 of the fiber bundle F to form the second reinforcing layer 32 and is smaller than the winding angle θ1 of the fiber bundle F to form the hoop reinforcing layer 31A, but the angles are not limited thereto.

However, these configurations can produce the following advantageous effects. First, with the winding angle θ2 of the fiber bundle F to form the helical reinforcing layer 31B set within the aforementioned range, the orientation of the fiber bundle F of the helical reinforcing layer 31B can be made closer to the orientation of the second reinforcing layer 32. As a result, the differences in thermal expansion and in thermal shrinkage between the helical reinforcing layer 31B and the second reinforcing layer 32 can be reduced so that the strength at the interface between the helical reinforcing layer 31B and the second reinforcing layer 32 can be secured.

In the aforementioned embodiment, the length L of the helical reinforcing layer 31B along the axis C direction of the high-pressure tank 1 is 0.3 times or greater than 0.3 times the outer diameter D of the high-pressure tank, but is not limited thereto.

However, such a configuration can produce the following advantageous effects. With the length L of the helical reinforcing layer 31B along the axis C direction set to 0.3 times or greater than 0.3 times the outer diameter D of the high-pressure tank 1, the bending strength of the helical reinforcing layer 31B can be surely improved. It should be noted that when the length L of the helical reinforcing layer 31B along the axis C direction is less than 0.3 times the outer diameter D of the high-pressure tank 1, the aforementioned advantageous effect could not be sufficiently exerted. The ground for this is the stress distribution of the first reinforcing layer of the comparative example shown in the drawing on the lower side of FIG. 3. Specifically, the ground is that the stress becomes substantially constant from the position with a distance from the end portion of the high-pressure tank of 0.3 times the outer diameter D.

In the aforementioned embodiment, the winding angle θ2 of the fiber bundle F to form the first end portion 31b on the hoop reinforcing layer 31A side of the helical reinforcing layer 31B is greater than the winding angle θ2 of the fiber bundle F to form the second end portion 31c on the side end portion 22 side, but for example, the winding angle of the helical reinforcing layer 31B may be constant, and is not limited thereto.

However, such a configuration can produce the following advantageous effect. The winding angle θ2 of the fiber bundle F to form the helical reinforcing layer 31B is closer to the winding angle θ1 of the fiber bundle F of the hoop reinforcing layer 31A on the hoop reinforcing layer 31A side and is closer to the winding angle θ3 of the fiber bundle F of the second reinforcing layer 32 on the side end portion 22 side. Therefore, the helical reinforcing layer 31B offsets the difference in strength between the hoop reinforcing layer 31A and the second reinforcing layer 32, so that the stress concentration due to the difference in strength can be reduced.

In the aforementioned embodiment, the winding angle θ2 of the fiber bundle F to form the helical reinforcing layer 31B is set within the range between 80° and less than 89°, but is not limited to this relation. However, such a configuration can produce the following advantageous effect. With the winding angle θ2 of the fiber bundle F to form the helical reinforcing layer 31B set within the range between 80° and less than 89°, the helical reinforcing layer 31B stably wound can be formed in a narrower area of the body 21, and slipping of the fiber bundle F in the axis C direction is suppressed.

Next, the following will describe a method for producing the high-pressure tank according to an embodiment of the present disclosure. Some descriptions of the same characteristics as those of the aforementioned high-pressure tank will be omitted.

FIG. 5 shows the overall flow of a producing method.

The producing method of the present embodiment roughly includes three steps of step S101 of preparing the liner 20, step S102 of forming the first reinforcing layer 31, and step S103 of forming the second reinforcing layer 32. Each step will be described below.

Figure 5A:
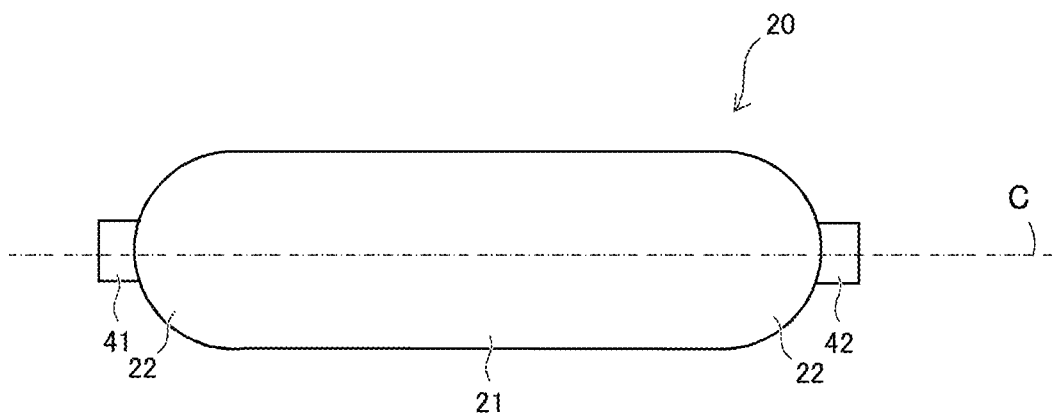
FIG. 5A is a view showing a step of preparing a liner in the flowchart shown in FIG. 4.

In step S101, the liner 20 is prepared as shown in FIG. 5A. The liner 20 includes the body 21, the side end portions 22 on the opposite sides of the body, and the caps 41 and 42. The liner 20 is held with the caps 41 and 42 rotatably about the axis C. It should be noted that in the present embodiment, the liner 20 is held with the caps 41 and 42, but may be held with only one of them. However, holding the liner with both the caps is more likely to secure a high rigidity required in the filament winding.

Figure 5B:
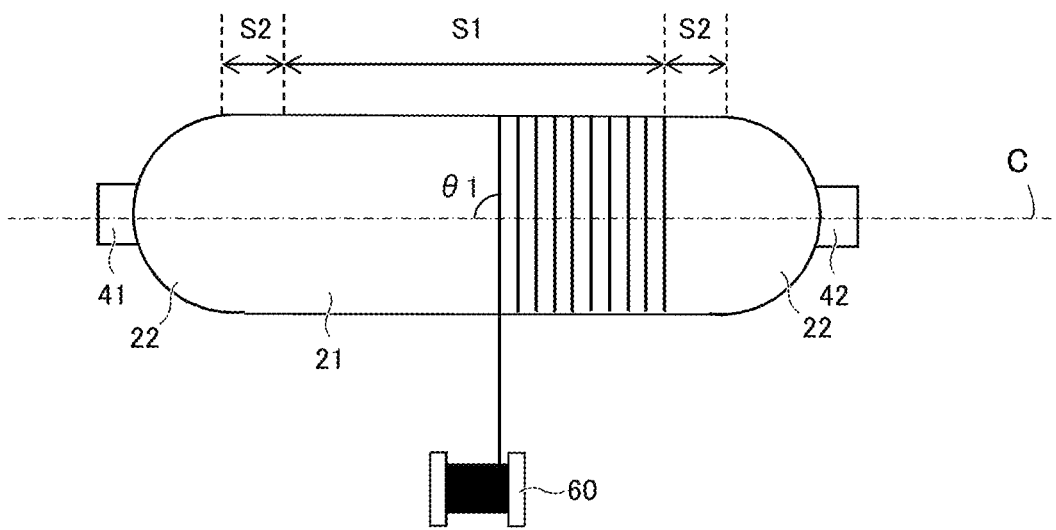
FIG. 5B is a view showing formation of a hoop reinforcing layer in a step of forming a first reinforcing layer in the flowchart shown in FIG. 4.
Figure 5C:
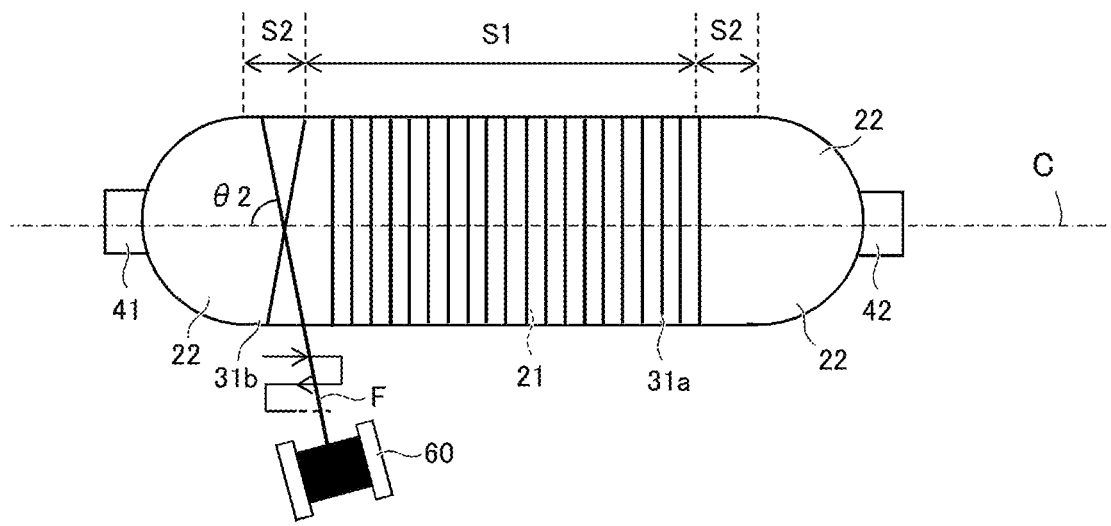
FIG. 5C is a view showing formation of a helical reinforcing layer in the step of forming the first reinforcing layer in the flowchart shown in FIG. 4.

In step S102, the first reinforcing layer 31 is formed. In the present embodiment, as shown in FIG. 5B and FIG. 5C, the first reinforcing layer 31 is formed by winding the resin-containing fiber bundle F so as to cover the body 21 of the liner prepared in step S101. More specifically, the fiber bundle F is fed from a movable fiber bundle feeding section 60 to be wound while the liner 20 is rotated about the axis C. The fiber bundle feeding section 60 moves along the axis C and can also adjust the winding angle of the fiber bundle F relative to the axis C. The characteristics of winding the first reinforcing layer 31 will be separately described later.

Figure 5D:
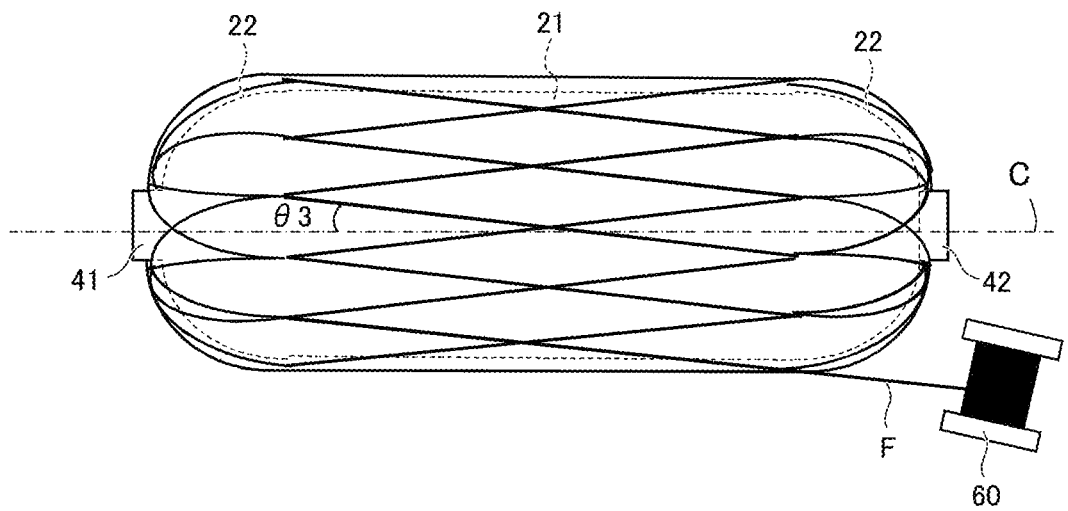
FIG. 5D is a view showing a step of forming a second reinforcing layer through low-angle helical winding in the flowchart shown in FIG. 4.
Figure 6:
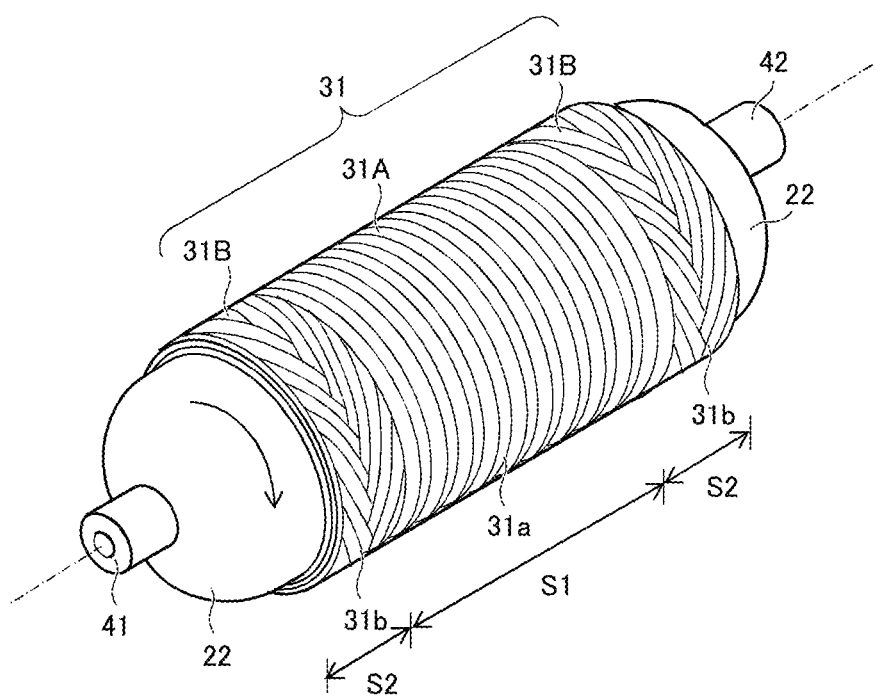
FIG. 6 is a view showing a state of the first reinforcing layer wound before forming the second reinforcing layer.

In step S103, the second reinforcing layer 32 is formed. In the present embodiment, as shown in FIG. 5D, the second reinforcing layer 32 is formed by winding the resin-containing fiber bundle F so as to cover the first reinforcing layer 31 and the side end portions 22. Similarly to step S102, the fiber bundle F is fed from the movable fiber bundle feeding section 60 to be wound while the liner 20 is rotated about the axis C. The difference from step S102 is the positional relation between the fiber bundle feeding section 60 and the liner 20. In the present step, the fiber bundle F is wound so as to extend between the side end portions 22 of the liner. The angle θ3 formed by the fiber bundle F and the axis C is, for example, 60° or smaller. This method is generally referred to as low-angle helical winding.

Step S102 will be further described in detail. Step S102 includes a step of forming the hoop reinforcing layer 31A as shown in FIG. 5B and a step of forming the helical reinforcing layer 31B as shown in FIG. 5C.

In the step of forming the hoop reinforcing layer 31A, the hoop reinforcing layer 31A is formed through hoop winding of the fiber bundle F in the midsection S1 of the body 21. The hoop winding is a winding method in which the angle θ1 formed by the fiber bundle F and the axis C is substantially a right angle and the fiber bundle F is wound so as to overlap with the adjacent fiber bundle F along the edges with no clearance. The adjacent fiber bundle F is the fiber bundle F that is wound in the previous turn of rotation of the liner 20 about the axis C. The angle θ1 is, for example, 89° or greater.

In the step of forming the helical reinforcing layer 31B, the helical reinforcing layer 31B is formed through helical winding of the fiber bundle F in the section S2 on at least one end side of the midsection S1 along the axis C direction of the high-pressure tank. In the helical winding adopted for forming the helical reinforcing layer 31B, the winding angle θ2 formed by the fiber bundle F and the axis C is smaller than that formed in the hoop winding, and the fiber bundles F are wound so as to cross each other. Further, unlike the aforementioned low-angle helical winding, the fiber bundle F is wound around the body 21 of the liner. In general, such winding is referred to as high-angle helical winding as compared to the low-angle helical winding. The winding angle θ2 is, for example, within the range between 80° and less than 89°.

In the present embodiment, the steps of forming the hoop reinforcing layer 31A and the helical reinforcing layer 31B are alternately performed. One layer referred to herein is a layer having a thickness substantially equivalent to the thickness of one fiber bundle F. One layer in hoop winding is a layer formed by moving the fiber bundle feeding section 60 from one end to the other end of the midsection S1. Meanwhile, one layer in the high-angle helical winding is formed such that the fiber bundle feeding section 60 reciprocates in the section S2 as shown in FIG. 5C so as to entirely cover the target area. The target area in this case may be a part of the section S2.

When the sections S2 are located on both sides of the midsection S1, the layers are alternately formed, for example, as follows. (1) First, as shown in FIG. 5B, a single layer of the hoop reinforcing layer 31A is formed in the midsection S1. (2) As shown in FIG. 5C, two single layers of the helical reinforcing layer 31B are formed in the section S2 on one side. (3) A single layer of the hoop reinforcing layer 31A is formed in the midsection S1 from one side toward the other side. (4) Two single layers of the helical reinforcing layer 31B are formed in the section S2 on the other side. In this manner, (1) to (4) are repeated so that the hoop reinforcing layer 31A and the helical reinforcing layer 31B are formed by alternately forming the layers through hoop winding and helical winding.

In step S102, the length L of the helical reinforcing layer 31B along the axis C direction, that is, the length of the section S2 is 0.3 times or greater than 0.3 times the outer diameter D of the high-pressure tank 1 to be produced. In step S102, the helical reinforcing layer 31B is wound so as to have an inclined surface relative to the surface 21a of the body 21 in the cross section along the axis C direction of the high-pressure tank 1 from the boundary 24 between the side end portion 22 and the body 21 of the liner 20 toward the hoop reinforcing layer 31A side.

In step S102, as shown in FIG. 3 described above, the helical reinforcing layer 31B is formed such that the fiber bundle F is wound so that the winding angle θ2 of the fiber bundle F to form the first end portion 31*b* on the hoop reinforcing layer 31A side is greater than the winding angle θ2 of the fiber bundle F to form the second end portion 31*c* on the side end portion 22 side. In particular, in the present embodiment, the winding angle θ2 of the fiber bundle F of the helical reinforcing layer 31B is greater in a portion closer to the midsection S1.

The aforementioned configurations can produce the following advantageous effect. The helical reinforcing layer 31B arranged in parallel with the hoop reinforcing layer 31A in the first reinforcing layer 31 is positioned near the side end portion 22. Therefore, in forming the second reinforcing layer 32, even when the stress is exerted on the liner 20 on which the first reinforcing layer 31 is formed, from the direction crossing the axis C direction of the high-pressure tank 1, the strength can be secured by the helical reinforcing layer 31B.

In the aforementioned embodiment, in step S103 of forming the second reinforcing layer 32, the fiber bundle F is wound through helical winding such that the second reinforcing layer 32 extends between the side end portions 22, and the winding angle θ2 of the fiber bundle F to form the helical reinforcing layer 31B is greater than the winding angle θ3 of the fiber bundle F to form the second reinforcing layer 32 and is smaller than the winding angle θ1 of the fiber bundle F to form the hoop reinforcing layer 31A. However, such a configuration is not essential.

However, such a configuration can produce the following advantageous effects. With the winding angle θ2 of the fiber bundle F to form the helical reinforcing layer 31B set within the range of the present configuration, the orientation of the fiber bundle F of the helical reinforcing layer 31B can be made closer to the orientation of the second reinforcing layer 32. As a result, the differences in thermal expansion and in thermal shrinkage between the helical reinforcing layer 31B and the second reinforcing layer 32 can be reduced, so that the strength at the interface between the helical reinforcing layer 31B and the second reinforcing layer 32 can be secured. Further, with the winding angle θ2 set within the range of the present configuration, the first layer to form the second reinforcing layer 32 is wound around the helical reinforcing layer 31B which has a winding angle closer to the winding angle θ3 as compared to the hoop winding layer, and thus, stable winding can be realized.

In the aforementioned embodiment, in step S102 of forming the first reinforcing layer 31, the length L of the helical reinforcing layer 31B along the axis C direction is 0.3 times or greater than 0.3 times the outer diameter D of the high-pressure tank, but this configuration is not essential.

However, such a configuration can produce the following advantageous effect. With the length L of the helical reinforcing layer 31B along the axis C direction set to 0.3 times or greater than 0.3 times the outer diameter D of the high-pressure tank 1, the bending strength of the helical reinforcing layer 31B can be surely improved. When the length L of the helical reinforcing layer 31B along the axis C direction is less than 0.3 times the outer diameter D of the high-pressure tank 1, the aforementioned advantageous effect could not be sufficiently exerted.

In the aforementioned embodiment, in the step of forming the first reinforcing layer, the helical reinforcing layer is formed so as to have an inclined surface relative to the surface of the body from the boundary between the side end portion and the body toward the hoop reinforcing layer side, but this configuration is not essential.

However, such a configuration can produce the following advantageous effects. Firstly, with the inclined surface 31*a* provided in the helical reinforcing layer 31B, the step between the outer peripheral surface of the side end portion 22 and the surface of the helical reinforcing layer 31B can be reduced, so that the stress concentration due to the step can be suppressed. In addition, when the portion corresponding to the inclined surface of the helical reinforcing layer is formed through hoop winding, the positional deviation could occur. The reason is that when the inclined surface is provided, since the target surface of winding is inclined relative to the tensile force direction during winding, the force in the horizontal direction of the inclined surface becomes greater relative to the friction during winding, which causes the fiber bundle to slip off the inclined surface. By contrast, forming the inclined surface through helical winding as in the present configuration reduces the inclination of the target surface of winding relative to the tensile force direction during winding, thereby mitigating the slipping.

In the aforementioned embodiment, in the step of forming the first reinforcing layer 31, the winding angle θ2 of the fiber bundle F of the helical reinforcing layer 31B is greater in the first end portion 31*b* on the hoop reinforcing layer 31A side than in the second end portion 31*c* on the side end portion 22 side, but this configuration is not essential.

However, such a configuration can produce the following advantageous effect. The winding angle θ2 of the fiber bundle F to form the helical reinforcing layer 31B is closer to the winding angle θ1 of the fiber bundle F of the hoop reinforcing layer 31A in the first end portion 31*b* on the hoop reinforcing layer 31A side, and is closer to the winding angle θ3 of the fiber bundle F of the second reinforcing layer 32 in the second end portion 31*c* on the side end portion 22 side. Therefore, the helical reinforcing layer 31B offsets the difference in strength between the hoop reinforcing layer 31A and the second reinforcing layer 32, so that the stress concentration due to the difference in strength can be reduced.

In the aforementioned embodiment, in the step of forming the first reinforcing layer, the winding angle of the fiber bundle to form the helical reinforcing layer is within the range between 800 and less than 89°, but this configuration is not essential.

However, this configuration can produce the following advantageous effect. With the winding angle θ2 of the fiber bundle F to form the helical reinforcing layer 31B set within the range between 800 and less than 89°, the stably wound helical reinforcing layer 31B can be formed also in the narrow section S2 of the body 21.

In the aforementioned embodiment, in the step of forming the first reinforcing layer 31, the layers formed through hoop winding and helical winding are alternately formed, but this configuration is not essential. However, such a configuration can produce the following advantageous effect. When the helical reinforcing layer 31B is formed after forming the hoop reinforcing layer 31A, as the difference in shape between the reinforcing layers widens at the boundary 24 between the hoop reinforcing layer 31A and the helical reinforcing layer 31B, voids could be generated. By contrast, the present configuration forms alternately the hoop reinforcing layer 31A and the helical reinforcing layer 31B by one or two layers each, so that the layers are folded and joined together in an overlapping manner at the boundary 24, thereby suppressing the generation of the voids.

The present disclosure is not limited to the aforementioned embodiments, and can be realized with various configurations without departing from the spirit of the present disclosure. For example, the technical features of the embodiments corresponding to those described in the summary can be replaced or combined with each other, as appropriate, in order to solve a part or all of the aforementioned problem to be solved or to achieve a part or all of the aforementioned advantageous effects. Further, the technical features may be deleted unless they are described as essential in the present specification, as appropriate.

What is claimed is:

1. A high-pressure tank having dome shaped side end portions formed at opposite ends of a cylindrical portion, the high-pressure tank including:
- a liner having the cylindrical portion and the dome shaped side end portions provided at opposite ends of the body; and
- a reinforcing layer that covers the liner and is formed of a fiber-reinforced resin,
- wherein the reinforcing layer includes a first reinforcing layer that covers the body and a second reinforcing layer that covers the first reinforcing layer and the side end portions, the first reinforcing layer having:
  - a hoop reinforcing layer formed through hoop winding of a resin-containing fiber bundle in a midsection of the body; and
  - a helical reinforcing layer arranged in parallel with the hoop reinforcing layer along an axis direction of the high-pressure tank and formed through helical winding of the fiber bundle in a section on at least one end side of the midsection, the helical reinforcing layer forming a part of the dome shaped side end portions,
- wherein the helical reinforcing layer has a first end portion on a side of the hoop reinforcing layer and a second end portion on a side of the side end portion along the axis direction of the high-pressure tank, and a winding angle of the fiber bundle to form the first end portion is greater than a winding angle of the fiber bundle to form the second end portion.

2. The high-pressure tank according to claim 1, wherein the helical reinforcing layer has an inclined surface relative to an outer peripheral surface of the body in a cross section along the axis direction of the high-pressure tank from a boundary between each of the side end portions and the body toward a side of the hoop reinforcing layer.

3. The high-pressure tank according to claim 1, wherein
- the second reinforcing layer is formed through helical winding of the fiber bundle so as to extend between the side end portions, and
- a winding angle of the fiber bundle to form the helical reinforcing layer is greater than a winding angle of the fiber bundle to form the second reinforcing layer and smaller than a winding angle of the fiber bundle to form the hoop reinforcing layer.

4. The high-pressure tank according to claim 1, wherein a winding angle of the fiber bundle to form the helical reinforcing layer is within a range between 80° and less than 89°.

5. The high-pressure tank according to claim 1, wherein a length of the helical reinforcing layer along the axis direction is 0.3 times or greater than 0.3 times an outer diameter of the high-pressure tank.

* * * * *